United States Patent
Ogg

(10) Patent No.: US 8,324,758 B2
(45) Date of Patent: Dec. 4, 2012

(54) PARALLEL POWER BACK-UP SYSTEM

(75) Inventor: Randy Ogg, Newberry, FL (US)

(73) Assignee: Encell Technology, Inc., Charlottesville, VA (US)

( * ) Notice: Subject to any disclaimer, the term of this patent is extended or adjusted under 35 U.S.C. 154(b) by 291 days.

(21) Appl. No.: 12/748,830

(22) Filed: Mar. 29, 2010

(65) Prior Publication Data
US 2010/0253147 A1 Oct. 7, 2010

Related U.S. Application Data

(60) Provisional application No. 61/164,595, filed on Mar. 30, 2009.

(51) Int. Cl.
*H02J 7/00* (2006.01)
*H02J 9/00* (2006.01)
(52) U.S. Cl. ........................................................ 307/65
(58) Field of Classification Search .................... 307/64, 307/65, 66
See application file for complete search history.

(56) References Cited

U.S. PATENT DOCUMENTS

| | | | |
|---|---|---|---|
| 5,978,236 A | 11/1999 | Faberman et al. | |
| 6,064,179 A | 5/2000 | Ito et al. | |
| 2004/0053082 A1* | 3/2004 | McCluskey et al. | 429/9 |
| 2006/0246328 A1* | 11/2006 | Willets et al. | 429/17 |
| 2006/0292443 A1 | 12/2006 | Ogg et al. | |
| 2007/0108946 A1 | 5/2007 | Yamauchi et al. | |

OTHER PUBLICATIONS

International Search Report and Written Opinion dated May 25, 2010, 8 pages.
MIT Electric Vehicle Team, "A Guide to Understanding Battery Specifications," Dec. 2008 (3 pgs.).

* cited by examiner

*Primary Examiner* — Carlos Amaya
(74) *Attorney, Agent, or Firm* — Merchant & Gould

(57) ABSTRACT

System and methods of supplying power to a load are provided. A module monitors electrical grid power. When the grid power fails the module initially provides power from a performance battery. When a bulk energy power system has warmed-up/activated, the module switches the power to the load from the performance battery to the bulk energy power system.

20 Claims, 8 Drawing Sheets

| EXAMPLE | | A | B | C |
|---|---|---|---|---|
| Capacity (Ahr) | Typical @ 5 hour | 60 | 100 | 100 |
| | Min @ 5 hour | 54 | 90 | 90 |
| | Typical @ 1 hour | 54 | 90 | 90 |
| Chemistry | | NiCd | NiCd | NiMH |
| Voltage (V) | Nominal | 24 | 24 | 24 |
| | Cut-off Discharge | 18 | 18 | 18 |
| Standard Charge | Amperes | 12 | 20 | 20 |
| | Hours | 5 | 5 | 5 |
| Rapid Charge | Amperes | 60 | 100 | 100 |
| | Hours | 1 | 1 | 1 |
| Discharge (A) | Standard | 12 | 20 | 20 |
| | Max | 900 | 1500 | 1500 |
| | Pulse | 1500 | 2500 | 2500 |
| Cycle Life (%DOD) | 100% | 500 | 500 | 400 |
| | 80% | 1000 | 1000 | 800 |
| | 50% | 5000 | 5000 | 4000 |
| Self-Discharge (% loss in 28 days) | | 20 | 20 | 20 |
| Shelf Life (years) | | 30 | 30 | 30 |
| Temperature (°C) | Operating | -40  +50 | -40  +50 | -20  +50 |
| | Storage | -40  +50 | -40  +50 | -20  +50 |
| Internal Resistance (mΩ) | | 60 | 60 | 60 |
| Impedence (@ 1kHz) (mΩ) | | 15 | 15 | 15 |
| Weight (kg) | | 50 | 80 | 75 |
| Volume (cc) | | 20700 | 20700 | 20700 |
| Height (cm) | X | 26.67 | 26.67 | 26.67 |
| Battery Length (cm) | Y | 47.94 | 47.94 | 47.94 |
| Carrier Length | W | 52.94 | 52.94 | 52.94 |
| Width (cm) | Z | 16.19 | 16.19 | 16.19 |

FIGURE 5A

PARALLEL POWER BACK-UP SYSTEM

CROSS-REFERENCE TO RELATED APPLICATION

This application claims the benefit of U.S. Provisional Application No. 61/164,595 filed Mar. 30, 2009.

BACKGROUND

In general, conventional back-up batteries (e.g., back-up battery systems used for wireless or other large format back-up systems) have the strength of being low cost and the weaknesses of having a low rate and being slow to charge and easily damaged by high rate demand or charge. Thus, conventional back-up battery systems are best utilized when power is off for extended time, and do not function well for load leveling.

What is needed is a new back-up battery system that takes advantage of the strengths of conventional back-up batteries and functions well for load leveling.

SUMMARY

Provided is a parallel power back-up system comprising a performance battery, a bulk energy storage system, and a controller. The performance battery has a rate greater than 2C, for example, 5-8C; and a cycle life greater than 300 cycles, for example, 450-550 cycles, at C rate. The performance battery and the bulk energy storage system are connected in parallel through the controller and when power to a load fails, the controller initially provides power from the performance battery and then provides power from the bulk energy storage system.

Other objects, advantages and novel features of the present invention will become apparent from the following detailed description of the invention when considered in conjunction with the accompanying drawings.

BRIEF DESCRIPTION OF THE FIGURES OF THE DRAWING

FIGS. 5A and 5B are charts of characteristics of exemplary performance and bulk energy batteries in accordance with the present invention.

DETAILED DESCRIPTION

Figure 1:
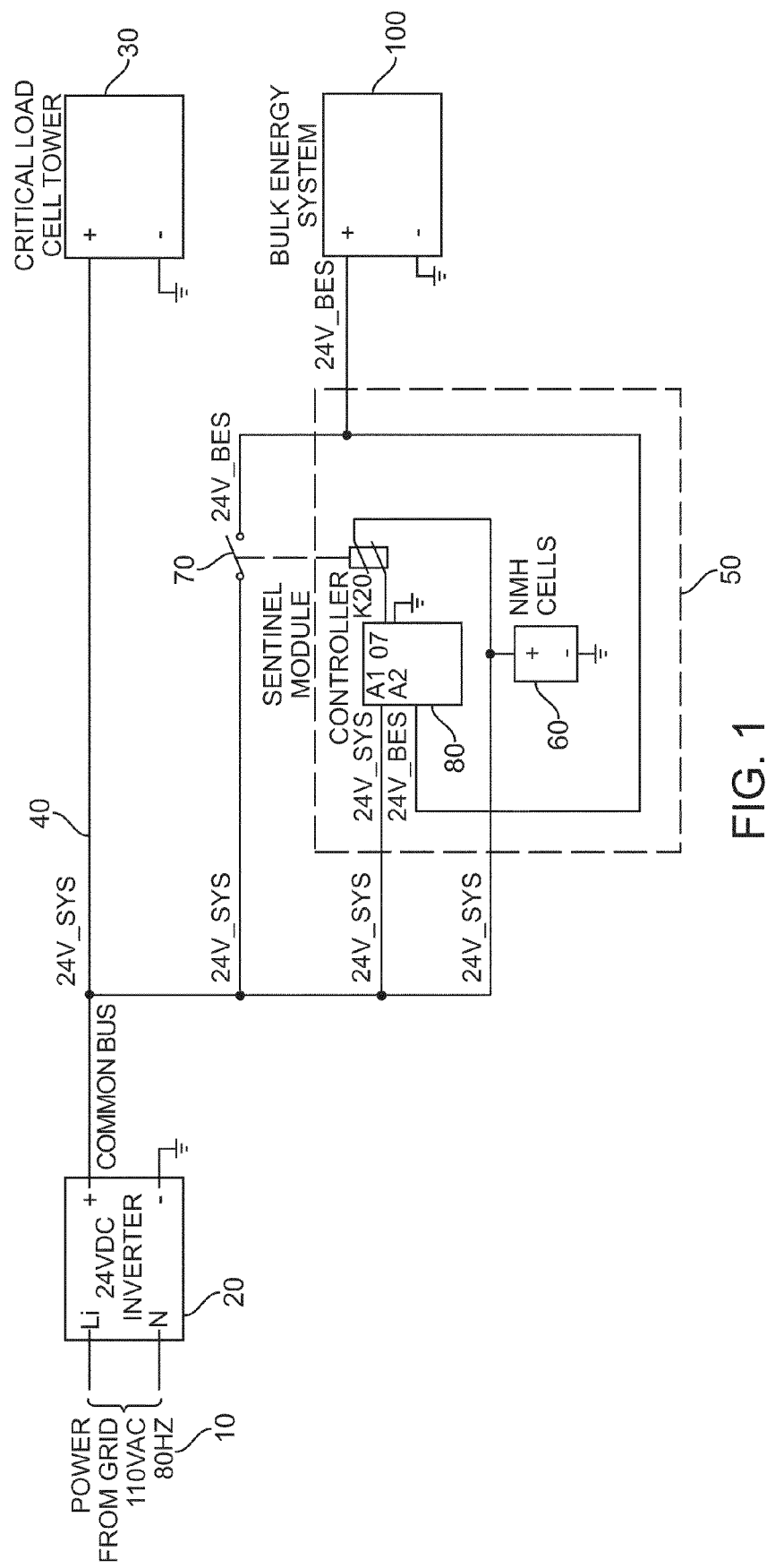
FIG. 1 is a functional block diagram of an exemplary system in accordance with the present invention.

FIG. 1 is a functional block diagram of an exemplary parallel power back-up system in accordance with the present invention. The exemplary system includes a power back-up switching module 50 that couples a power grid 10 and bulk energy system 100 to load 30. Module 50 can also couple performance battery 60 to load 30. Specifically, alternating current (AC) power from the electrical grid, represented by element 10, is supplied to inverter 20, which converts the AC power into direct current (DC) power. The DC current is then supplied to load 30 via bus 40. Load 30 can be, for example, a cellular base station tower.

When power from electrical grid 10 fails, module 50 provides a backup to load 30. Specifically, controller 80 senses the power failure and activates performance battery 60, which supplies power through a diode (not illustrated). Performance battery 60 continues to supply power to bus 40 until controller has determined that bulk battery 100 has warmed-up and starting functioning at its operating level. Controller 80 then operates relay 70 to switches the power from bulk energy system 100 to load 30. Although not illustrated in FIG. 1, the system can include a monitor/interface to provide feedback to users, such as the state of the batteries (e.g., the battery "health" and/or charge level). The monitor/interface can include a screen and a user-input interface, such as buttons.

The bulk energy storage system can be a bulk storage battery. The performance battery and the bulk storage battery can each be 24 volt batteries. The bulk storage battery can have a cycle life less than 400 cycles, for example, 200-300 cycles, at C rate. The performance battery (cells) can have a voltage less than 2 volts, for example, 1-1.5 volts, at C rate between 20-80% State of Charge; and the bulk storage battery (cells) can have a voltage greater than 2.0 volts, for example, 2.5-3.5 or 4.5-5.5 volts, at 0.25C rate between 20-80% State of Charge. The performance battery has a rate greater than 2C, for example, 5-8C; and a cycle life greater than 300 cycles, for example, 450-550 cycles, at C rate.

Conventional back-up system use one or more bulk energy storage systems. The parallel power back-up system disclosed herein provides a performance battery that works with a bulk energy storage system as used in conventional back-up systems (e.g., back-up battery systems used for wireless or other large format back-up systems) to create a parallel power back-up which creates a synergetic system with strengths of both the performance battery and the conventional bulk energy storage system. The performance battery does the work of load leveling and thereby protects the bulk energy storage system (e.g., the bulk storage battery) conventionally used as a back-up from constant damage as a load leveler. As a result, the life of the bulk energy storage system can be extended (e.g., doubled) and the capacity (run time) of the performance battery can be added to the parallel power back-up system. Additionally, the performance battery can provide a constant voltage as a load leveler to protect customers from antenna signal variation, which happens with conventional back-up systems. While the performance battery may be considered too expensive to provide the full back-up run time, the performance battery in conjunction with the conventional bulk energy storage system saves money, improves reliability, and reduces maintenance. Additionally, the parallel power back-up system disclosed herein solves a problem of existing alternate bulk energy storage systems, which require time to activate (i.e., warm up, reduce internal resistance and start functioning) before they can be put into service without damage and start feeding their power. In particular, bulk energy storage systems such as, for example, a fuel cell, flow cell, ultra capacitor, flywheel, pumped water, compressed air, superconducting magnetic energy, or generator, require time (e.g., 10 seconds to 5 minutes) to activate in order to be able to deliver energy.

Thus, the parallel power back-up system disclosed herein is an uninterruptible power supply (UPS) system that separates the load leveling function (i.e., attributable to the performance battery) and the back-up power function (i.e., attributable to the bulk energy storage system) of the UPS to improve performance and reduce size and cost of the system.

The parallel power back-up system has more capacity per volume than does the bulk energy storage system, as the parallel power back-up system has a higher energy density. While the parallel power back-up system is larger than the bulk energy storage system, the run time of the parallel power back-up system is greater than a run time which would be accounted for by the increase in size. Similarly, while the parallel power back-up system costs more initially, the parallel power back-up system is cheaper over the life of the parallel power back-up system since the parallel power back-up system lasts over twice as long as the bulk energy storage system but does not cost twice as much as the bulk energy storage system. The performance battery performs power leveling and intermittent support that is used to protect a much larger and less expensive per WHr bulk energy storage system (used for power outages) to extend the life and performance of the bulk energy storage system.

The performance battery and the bulk energy storage system are connected in parallel through a controller which adjusts voltage and/or current flow between the performance battery and the bulk energy storage system to improve overall performance. The performance battery can be much smaller than (e.g., less than one quarter or one tenth the size of) the bulk energy storage system. The performance battery can be much less expensive than (e.g., less than one half the cost of) the bulk energy storage system. The bulk energy storage system can cost less than $0.50/Whr, for example, less than $0.25/Whr, less than $0.16/Whr, or as low as $0.04/Whr. Conversely, the performance battery will typically cost greater than $0.50/Whr, but could costs as low as, for example, $0.25/Whr.

In an embodiment, the bulk energy storage system is a bulk storage battery. For batteries (either bulk storage or performance), the primary factor in cost is the chemistry utilized. The bulk storage battery can comprise a chemistry selected from the group consisting of lead-acid, nickel-iron, sodium-sulfur, and zinc-manganese dioxide. In an embodiment, the bulk storage battery comprises a chemistry that is not environmentally friendly such as, for example, lead-acid.

The performance battery can comprise a chemistry selected from the group consisting of nickel-metal hydride, nickel-zinc, silver-zinc, nickel-cadmium, lithium-ion, and lithium-polymer. In an embodiment, the performance battery comprises an environmentally friendly chemistry such as, for example, nickel-metal hydride or lithium-polymer.

The performance battery, in addition to having a high rate (i.e., greater than 2C), has a long life on float voltage, which can be estimated by long cycle life (e.g., life greater than 10 years on constant voltage float at RT). Conversely, the bulk storage battery has short life on float voltage, for example, less than 10 years at RT. The illustrative examples of the performance battery are intended to be non-limiting.

Figure 2A:
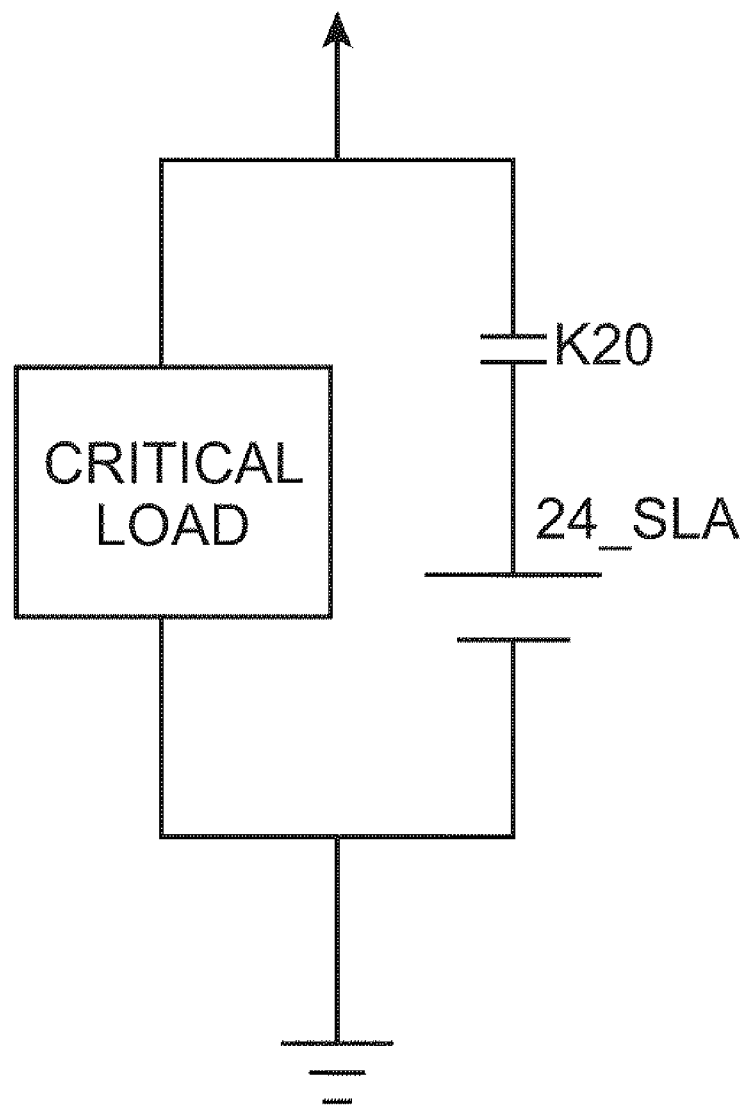
FIGS. 2A-2C are electrical schematic diagrams of an exemplary system in accordance with the present invention.
Figure 2B:
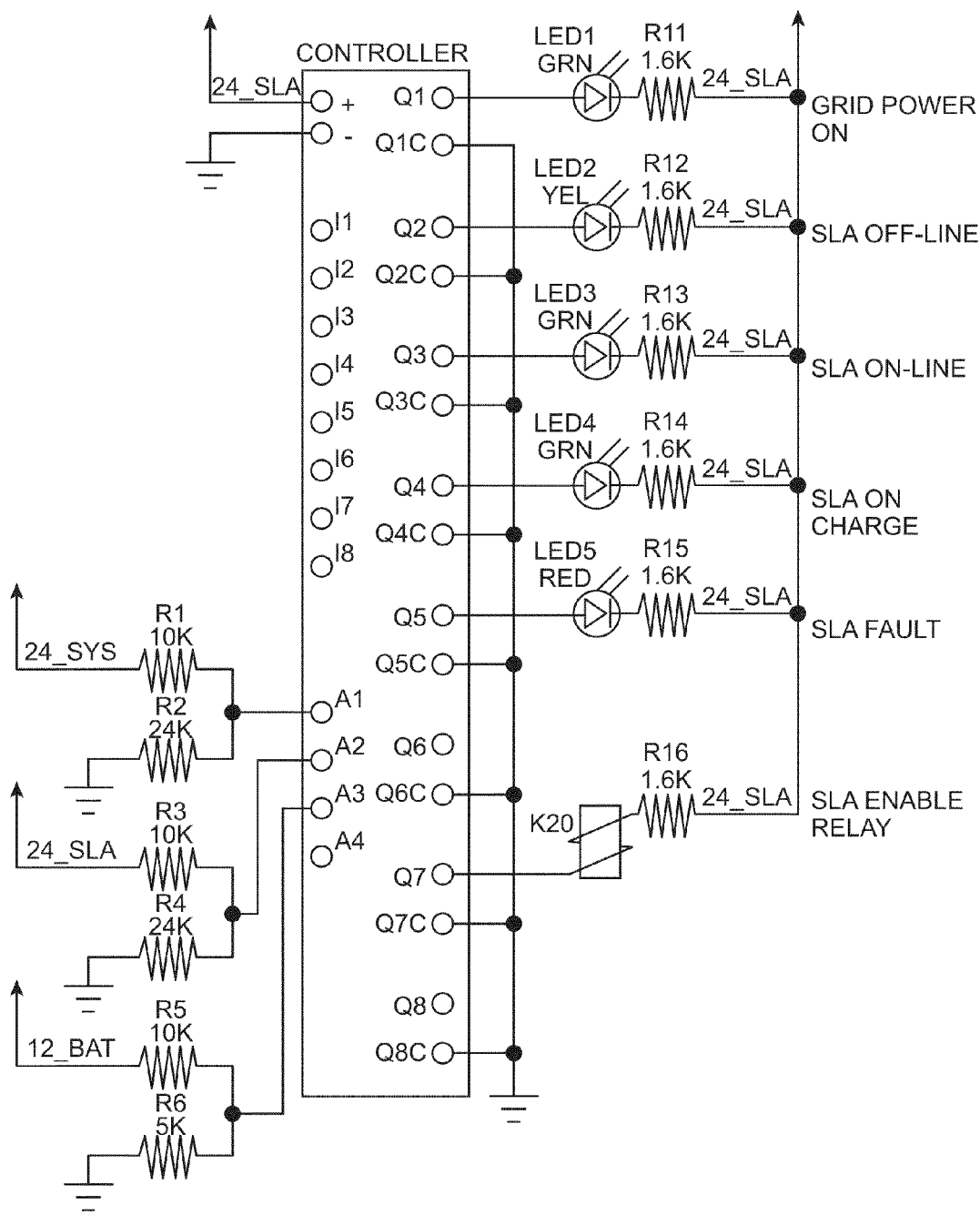
Figure 2C:
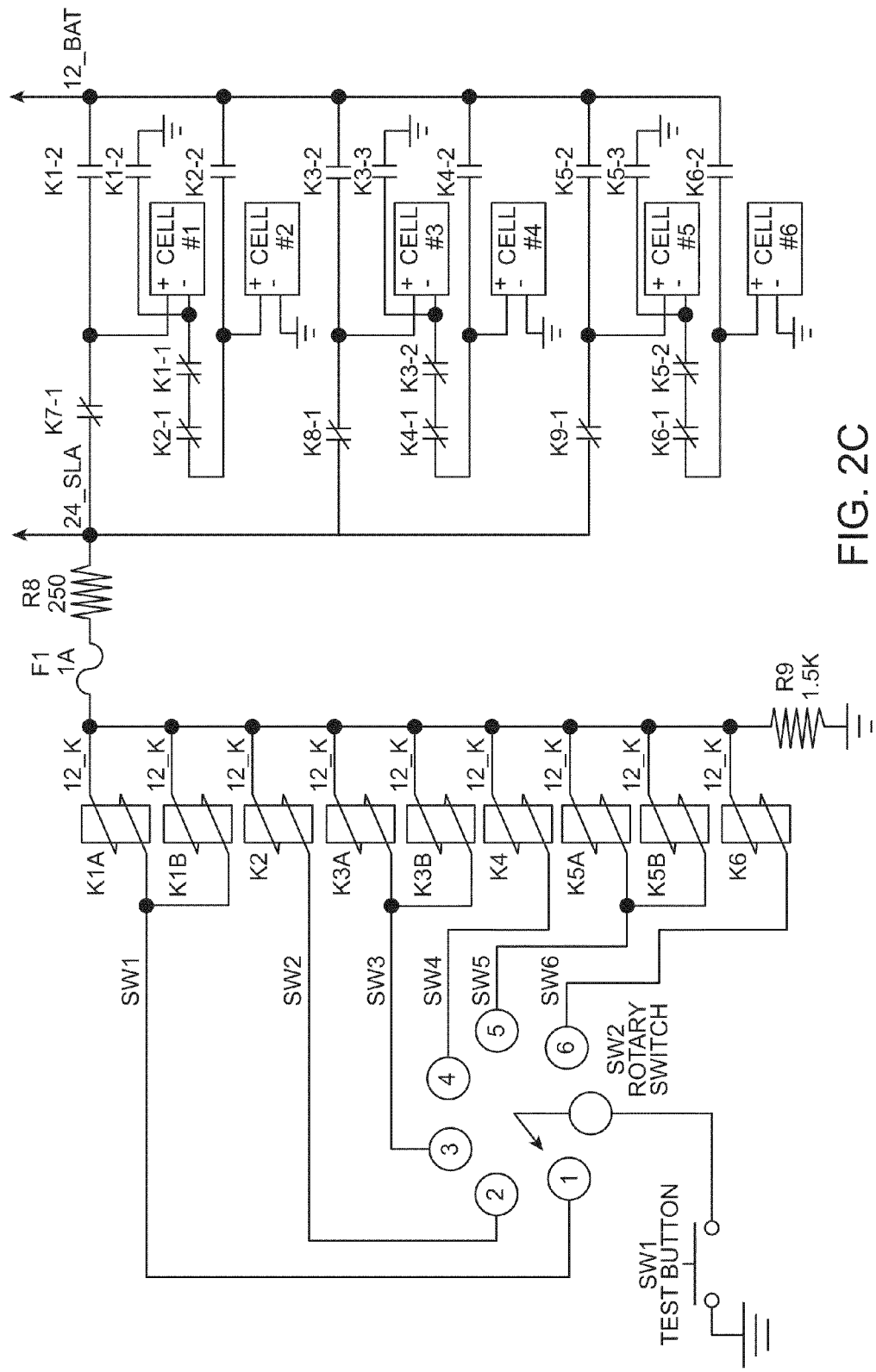

FIGS. 2A-2C are electrical schematic diagrams of an exemplary system in accordance with the present invention. FIG. 2A illustrates the parallel connection of the 24 volt bulk energy storage system to load 30. FIG. 2B illustrates controller 80 respectively coupled via resistors to the bus (24_SYS), bulk energy system 100 (24_SLA) and performance battery 60 (12_BAT). Controller 80 is also coupled to a plurality of LEDs to provide a monitor/interface indicating the status of the system. LED1 indicates whether the grid power is active, LED2 indicates whether the bulk energy system is offline, LED3 indicates whether the bulk energy system is offline, LED4 indicates whether the bulk energy system is being charged and LED5 indicates whether the bulk energy system has a fault.

FIG. 2C illustrates an exemplary schematic diagram of circuitry for testing the bulk energy storage system. Accordingly, when test switch S1 is actuated, the storage cell of the bulk energy system corresponding to the selection of rotary switch S2 is tested. Thus, to test each of the cells, the rotary switch is moved to different positions corresponding to each cell, and at each position test switch S1 is actuated.

Figure 3:
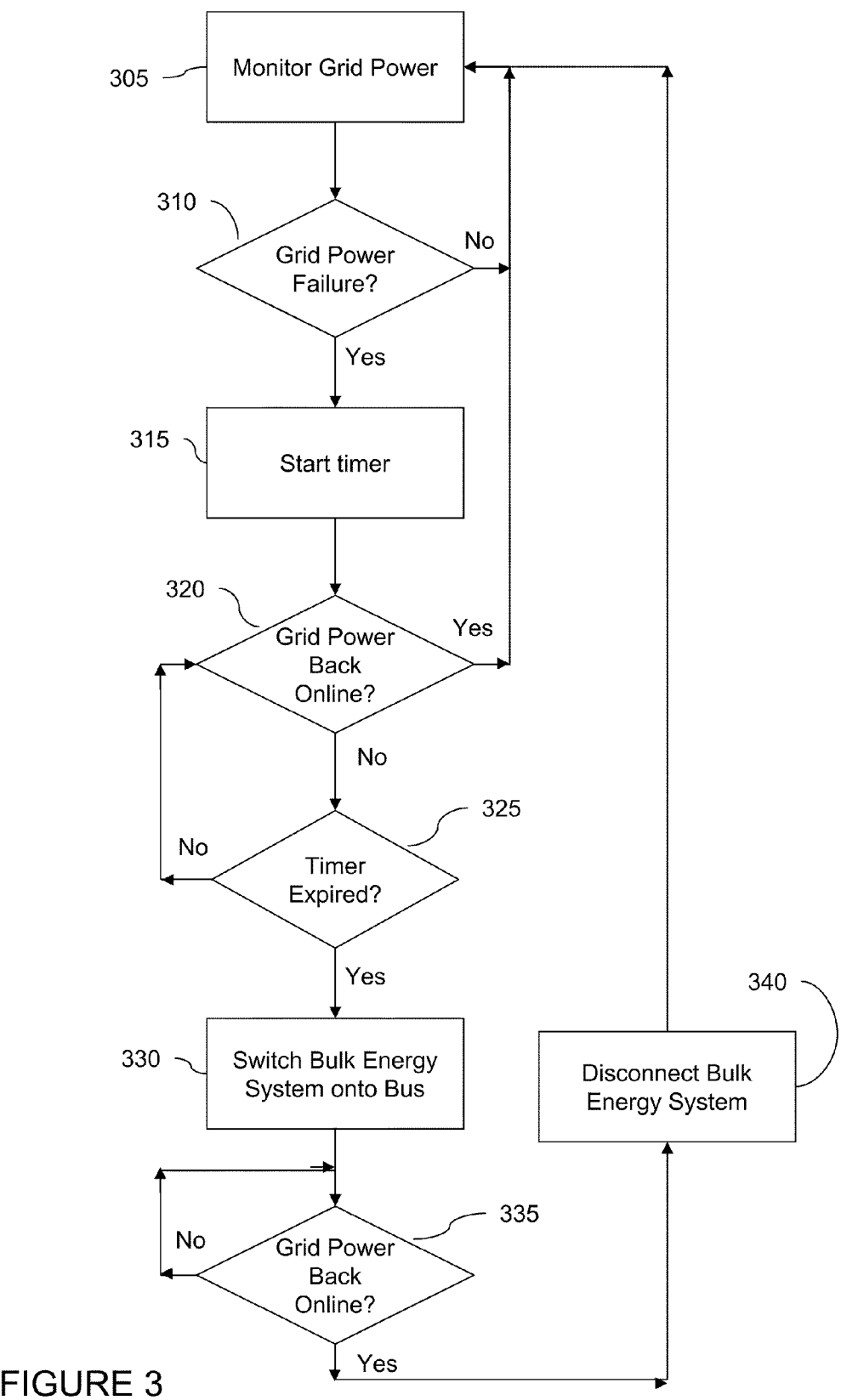
FIG. 3 is an exemplary method of switching power using the exemplary system in accordance with the present invention.

FIG. 3 is an exemplary method of switching power using the exemplary system in accordance with the present invention. Controller 80 monitors the power grid (step 305) and determines whether the grid power has failed (step 310). Grid power failure can be determined based upon the voltage on bus 40 falling below a predetermined operating level, such as 24 volts. As long as the grid power is operating normally ("No" path out of decision step 310), controller 80 will continue to monitor the power grid (step 305) and determine whether a failure has occurred (step 310).

When controller 80 determines that the power grid has failed ("Yes" path out of decision step 310), then controller 80 causes performance battery 60 to be switched onto bus 40 and controller 80 starts a timer (step 315). The timer is set for an amount of time required for the bulk energy power system to warm up, and this time period can be, for example, 5 minutes. While the timer is running, controller 80 continues to determine whether the grid power has come back online (step 320). When the grid power has come back online ("Yes" path out of decision step 320), then controller 80 resets the timer, disconnects the performance battery from bus 40 and continues to monitor the grid power (step 305).

When the grid power has not come back online ("No" path out of decision step 320) and when the timer has expired ("Yes" path out of decision step 325), then controller 80 causes switch 70 to connect the bulk energy system 100 to bus 40 (step 330). Controller 80 then continues to determine whether the grid power has come back online (step 335). When the grid power has come back online ("Yes" path out of decision step 335), then controller 80 causes switch 70 to disconnect the bulk energy system from bus 40 (step 340) and then continues to monitor the power grid (step 305).

Figure 4:
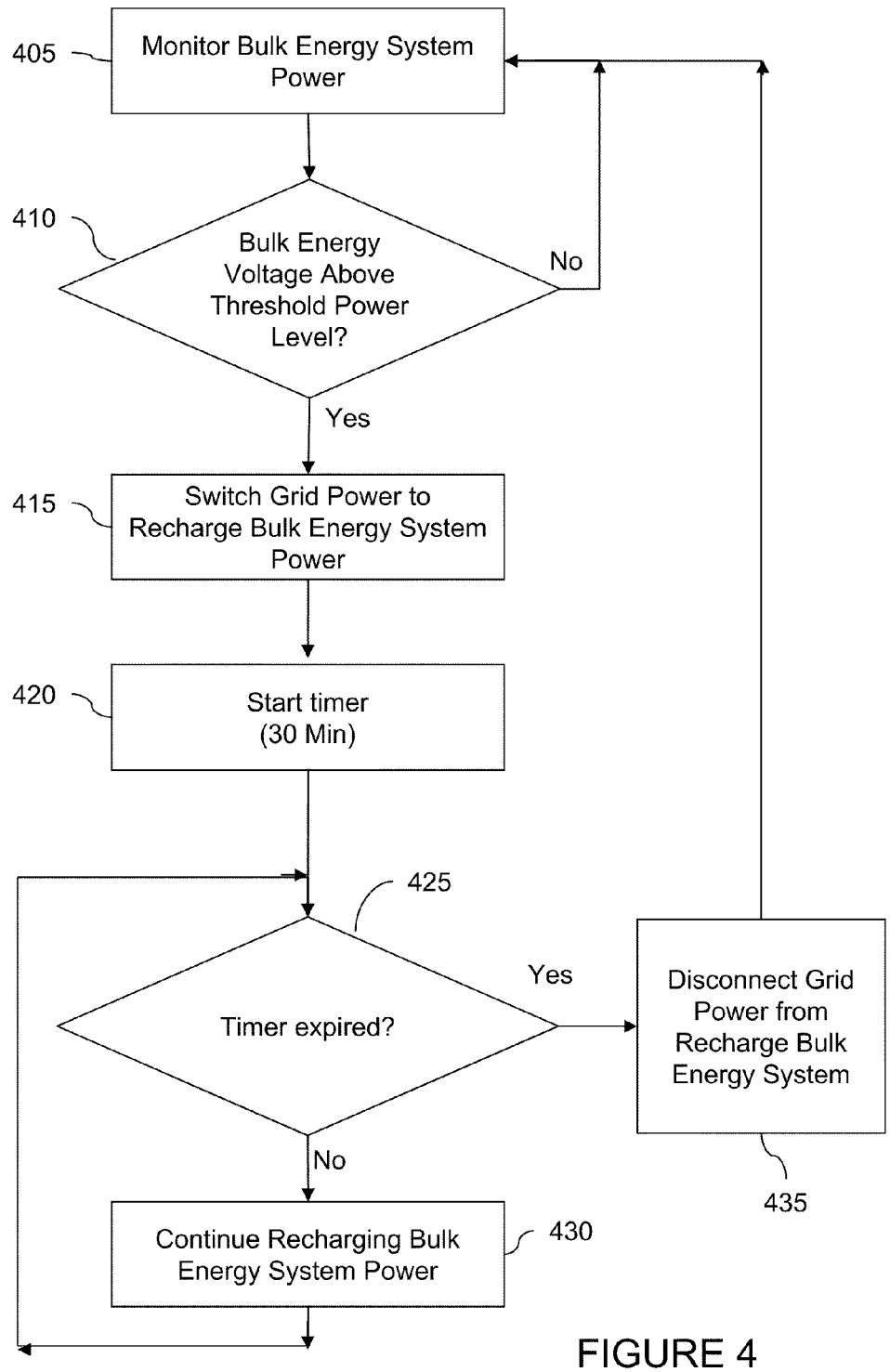
FIG. 4 is an exemplary method of recharging a battery in accordance with the present invention.

FIG. 4 is an exemplary method of recharging a battery in accordance with the present invention. Initially, controller 80 monitors bulk energy power system 100 (step 405) and determines whether the bulk energy voltage is above a threshold level (step 410). As long as the bulk energy voltage is above a threshold level ("No" path out of decision step 410), controller 80 continues to monitor the bulk energy system 100 (step 405).

When the bulk energy voltage level falls below the threshold level ("Yes" path out of decision step 410), then controller 80 causes switch 70 to pass the grid power to bulk energy system 100 (step 415). Controller 80 then starts a timer (step 420). The timer is set for a period of time required to ensure that the bulk energy voltage is stable at a desired level, which can be, for example, 30 minutes. As long as the timer continues to run ("No" path out of decision step 425), then controller 80 continues to allow recharging of the bulk energy system 100 (step 430). When the timer has expired ("Yes" path out of decision step 425), then controller 80 causes switch 70 to disconnect bulk energy system 40 from the bus, which also disconnects bulk energy system 100 from the grid power (step 435).

Figure 5B:
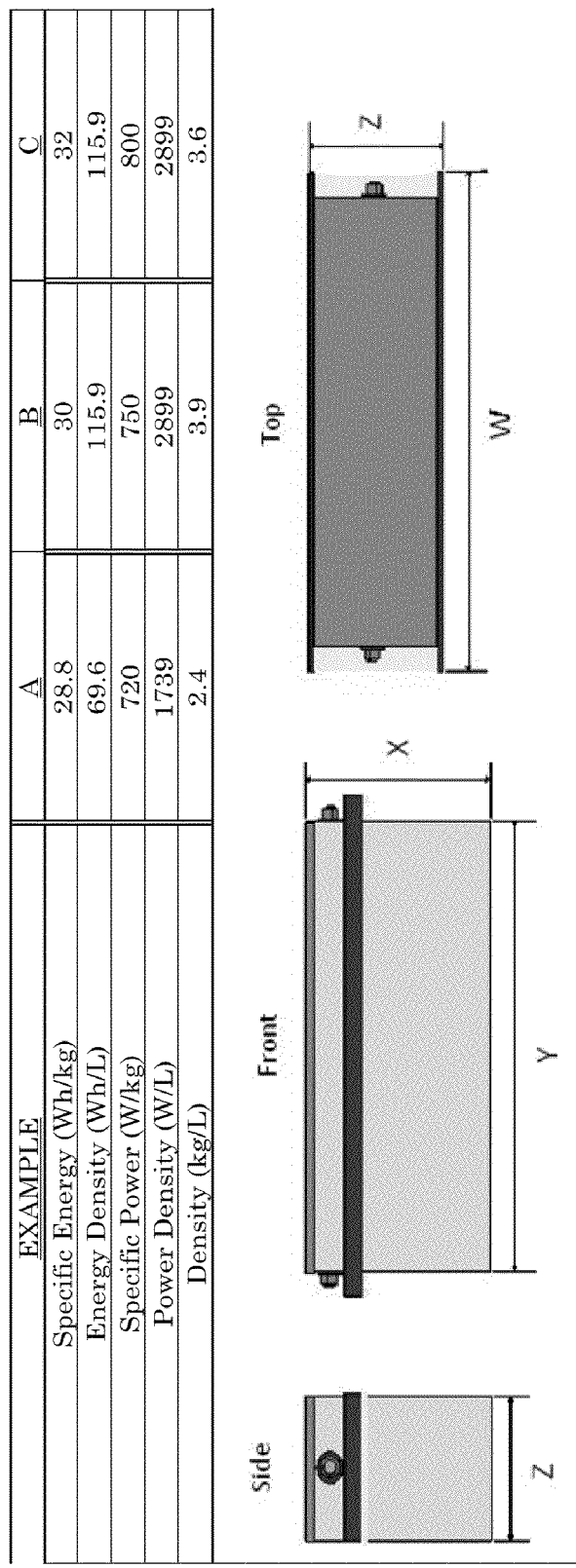

FIGS. 5A and 5B are charts of characteristics of exemplary performance and bulk energy batteries in accordance with the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Many modifications of the exemplary embodiments disclosed herein will readily occur to those of skill in the art. Accordingly, the parallel power back-up system disclosed herein is to be construed as including all structure and methods that fall within the scope of the appended claims.

What is claimed is:

1. A parallel power back-up system comprising:
a performance battery having:
   a rate greater than 2C; and
   a cycle life greater than 300 cycles at C rate;
a bulk energy storage system; and
a controller configured to:
   determine when grid power has failed,
   connect the performance battery to a bus in response to determining that the grid power has failed,
   initiate a timer after connecting the performance battery to the bus, and
   connect, at the expiry of the timer, the bulk energy storage system to the bus;
wherein the performance battery and the bulk energy storage system are connected in parallel to the bus through the controller.

2. The parallel power back-up system of claim 1, wherein the performance battery comprises a chemistry selected from the group consisting of nickel-metal hydride, nickel-zinc, silver-zinc, nickel-cadmium, lithium-ion, and lithium-polymer.

3. The parallel power back-up system of claim 1, wherein the bulk energy storage system comprises a bulk storage battery.

4. The parallel power back-up system of claim 3, wherein the bulk storage battery comprises a chemistry selected from the group consisting of lead-acid, nickel-iron, sodium-sulfur, and zinc-manganese dioxide.

5. The parallel power back-up system of claim 4, wherein the bulk storage battery comprises a chemistry that is not environmentally friendly.

6. The parallel power back-up system of claim 5, wherein the bulk storage battery comprises a lead-acid chemistry.

7. The parallel power back-up system of claim 4, wherein the bulk storage battery has a cycle life of 200-300 cycles at C rate.

8. The parallel power back-up system of claim 4, wherein the performance battery and the bulk storage battery each have a voltage of 24 volts.

9. The parallel power back-up system of claim 4, wherein:
a cell of the performance battery has a voltage less than 2.0 volts at C rate between 20-80% State of Charge; and
a cell of the bulk storage battery has a voltage greater than 2.0 volts at 0.25C rate between 20-80% State of Charge.

10. The parallel power back-up system of claim 9, wherein:
a cell of the performance battery has a voltage of 1-1.5 volts at C rate between 20-80% State of Charge; and
a cell of the bulk storage battery has a voltage of 2.5-3.5 volts at 0.25C rate between 20-80% State of Charge.

11. The parallel power back-up system of claim 1, wherein the performance battery is less than one quarter the size of the bulk energy storage system.

12. The parallel power back-up system of claim 11, wherein the performance battery is less than one tenth the size of the bulk energy storage system.

13. The parallel power back-up system of claim 1, wherein the performance battery comprises an environmentally friendly chemistry.

14. The parallel power back-up system of claim 13, wherein the performance battery comprises chemistry selected from the group consisting of nickel-metal hydride and lithium-polymer.

15. The parallel power back-up system of claim 1, wherein the bulk energy storage system is less than one half the cost of the bulk energy storage system.

16. The parallel power back-up system of claim 1, wherein the performance battery has a rate of 5-8C.

17. The parallel power back-up system of claim 1, wherein the performance battery has a cycle life of 450-550 cycles at C rate.

18. The parallel power back-up system of claim 1, wherein the bulk energy storage system is selected from the group consisting of a fuel cell, flow cell, ultra capacitor, flywheel, pumped water, compressed air, superconducting magnetic energy, and generator.

19. A method of providing back-up power through a bus, the method comprising:
determining, by a controller, if grid power has failed;
connecting, by the controller, a performance battery to the bus, the performance battery having a rate greater than 2C and a cycle life greater than 300 cycles at C rate;
initiating, by the controller, a timer after connecting the performance battery to the bus;
continuously monitoring in duration of the timer, if the grid power is back online; and
ending the timer, if the grid power is back online, and disconnecting the performance battery from the bus, else connecting at the expiry of the timer, a bulk energy storage system to the bus;
wherein the performance battery and the bulk energy storage system are connected in parallel to the bus through the controller.

20. A system for providing power back-up to a load, the load being connected to a bus, the system comprising:
a performance battery having a rate greater than 2C and a cycle life greater than 300 cycles at C rate;
a bulk energy storage system; and
a power back-up switching module configured to:
   determine if grid power to the load has failed,
   connect the performance battery to the bus,
   initiate a timer after connecting the performance battery to the bus,
   continuously monitor, in duration of the timer, if the grid power is back online, and
   if the grid power is back online, end the timer and disconnect the performance battery from the bus, else connect, at the expiry of the timer, the bulk energy storage system to the bus;
wherein the performance battery and the bulk energy storage system are connected in parallel to the bus through the power switching module.

* * * * *